United States Patent
Tsai et al.

(10) Patent No.: US 12,189,741 B2
(45) Date of Patent: Jan. 7, 2025

(54) PASSWORD INPUT METHOD

(71) Applicant: CASTLES TECHNOLOGY CO., LTD., New Taipei (TW)

(72) Inventors: Chia-Che Tsai, Taoyuan (TW); Chia-En Tsai, Taipei (TW)

(73) Assignee: CASTLES TECHNOLOGY CO., LTD., New Taipei (TW)

(*) Notice: Subject to any disclaimer, the term of this patent is extended or adjusted under 35 U.S.C. 154(b) by 492 days.

(21) Appl. No.: 17/551,435

(22) Filed: Dec. 15, 2021

(65) Prior Publication Data

US 2023/0128042 A1  Apr. 27, 2023

(30) Foreign Application Priority Data

Oct. 27, 2021  (TW) .................... 110139844

(51) Int. Cl.
*G06F 21/32* (2013.01)
*G06F 3/0488* (2022.01)
*G06V 40/60* (2022.01)
*G09B 21/00* (2006.01)

(52) U.S. Cl.
CPC ............ *G06F 21/32* (2013.01); *G06F 3/0488* (2013.01); *G06V 40/67* (2022.01); *G09B 21/007* (2013.01)

(58) Field of Classification Search
CPC .... G06F 21/32; G06F 3/0488; G06F 3/04886; G06F 21/36; G06F 3/04883; G06F 21/31; G06V 40/67; G09B 21/007
USPC ......................................................... 713/185
See application file for complete search history.

(56) References Cited

U.S. PATENT DOCUMENTS

| | | | |
|---|---|---|---|
| 2017/0269828 A1 | 9/2017 | Görlich et al. | |
| 2018/0121668 A1* | 5/2018 | Karnik | G06F 21/74 |
| 2018/0203600 A1* | 7/2018 | Hajimusa | G06F 21/45 |

FOREIGN PATENT DOCUMENTS

| | | |
|---|---|---|
| CN | 103246836 A | 8/2013 |
| CN | 107491254 A | 12/2017 |
| TW | 201426400 A | 7/2014 |
| TW | I507968 B | 11/2015 |

OTHER PUBLICATIONS

Search Report for TW 110139844 (Parent Application) Received Aug. 18, 2022.
Search Report for TW 110139844 (Parent Application) Received Aug. 18, 2022—English Translation.
Combined Search and Examination Report for foreign counterpart application GB2215835.6, date Apr. 28, 2023.

* cited by examiner

*Primary Examiner* — Jeffrey C Pwu
*Assistant Examiner* — Nega Woldemariam (57) ABSTRACT

A password input method is disclosed. The password input method is conducted by a microprocessor of a touch sensitive password input device, wherein the touch sensitive password input device is integrated in an electronic device, such as point-of-sale payment terminal, smartphone, tablet computer, all-in-one computer, door station, and keyless electronic door lock. In case of the password input method according to the present invention being conducted, the touch sensitive password input device is controlled to guide a visually impaired person to successfully complete a password input operation with high security.

19 Claims, 13 Drawing Sheets

PASSWORD INPUT METHOD

BACKGROUND OF THE INVENTION

1. Field of the Invention

The present invention relates to the technology field of password input devices, and more particularly to a password input method conducted by a microprocessor of a touch sensitive password input device for allowing a visually impaired person to conduct a password input operation with high security.

2. Description of the Prior Art

With advancing science and technology development, there are various electronic devices equipped with a touchscreen proposed for bringing human the convenient life. Undoubtedly, in case of the electronic devices having touchscreen being widely used in daily life, traditional electronic devices equipped with a physical keyboard are therefore replaced by these touch sensitive electronic devices. For example, traditional password input devices having physical keyboard have been gradually replaced by touch sensitive password input devices that are equipped with touchscreen nowadays. It is worth noting that, there is a corresponding Braille character formed on each of the buttons of the traditional password input device's physical keyboard, such that a visually impaired person is able to conduct an input operation by firstly touching the Braille character and then pressing down the button. However, because there are no Braille characters disposed on the touchscreen of the touch sensitive password input device, it is difficult for the visually impaired person to conduct an input operation by completing a touch operation on the touchscreen of the touch sensitive password input device.

In view of that, a touch sensitive password input device for allowing visually impaired persons to conduct a password input operation is developed and proposed. When the visually impaired person uses his finger to tap a specific position of the touch sensitive password input device's touch screen, the touch sensitive password input device broadcasts a corresponding audible sound so as to let the visually impaired person know what key is now under tapping. Therefore, it is understood that, during conducting a password input operation, a person standing near the touch sensitive password input device can also know a whole password the visually impaired person inputted by hearing a series of audible sound that are broadcasted by the touch sensitive password input device. In other words, the touch sensitive password input device shows a principal drawback of low security in practical use.

From above descriptions, it is understood that there is still room for improvement in the conventional touch sensitive password input device. In view of that, inventors of the present invention have made great efforts to make inventive research and eventually provided a password input method conducted by a microprocessor of a touch sensitive password input device for allowing a visually impaired person to conduct a password input operation with high security.

SUMMARY OF THE INVENTION

The primary objective of the present invention is to disclose a password input method. The password input method is conducted by a microprocessor of a touch sensitive password input device. In case of the password input method according to the present invention being conducted, the touch sensitive password input device is controlled to guide a visually impaired person to successfully complete a password input operation with high security.

For achieving the primary objective mentioned above, the present invention provides an embodiment of the password input method, comprising following steps of:

(1) after a finger taps a touchscreen of the touch sensitive password input device at a tap position, designating a virtual numeral 5 to be selected, and then controlling the touch sensitive password input device to show a first indication;

(2) determining whether the finger conducts a swing operation on the touchscreen in order to select another one virtual numeral that is different from the forgoing virtual numeral 5, if yes, going to step (3); otherwise, going to step (4);

(3) controlling the touch sensitive password input device to show a second indication, and then going back to the forgoing step (2);

(4) determining whether the finger conducts an input operation on the touchscreen in order to make a designated numeral be inputted into the touch sensitive password input device, if yes, going to step (6); otherwise, going to step (5);

(5) in case of the finger not touching the touchscreen for a period of time, controlling the touch sensitive password input device to show a third indication, and then going back to the forgoing step (1);

(6) recording the designated numeral, and then controlling the touch sensitive password input device to show a fourth indication; and (7) repeating the forgoing steps (1)-(6) until a confirm command or a cancel command is inputted into the touch sensitive password input device by utilizing the finger to conduct at least one swing operation and the input operation.

In one embodiment, the wherein the touch sensitive password input device is integrated in an electronic device selected from a group consisting of point-of-sale payment terminal, smartphone, tablet computer, all-in-one computer, door station, and keyless electronic door lock.

In one embodiment, before conducting the step (1), the microprocessor delimits a first touching region and a second touching region that falls within the first touching region from the touchscreen, and then controls the touch sensitive password input device to show a fifth indication for informing a visually impaired person that a password input password input operation can be started.

In one embodiment, during the step (1) being conducted, the microprocessor determines whether the tap position falls within the second touching region, if yes, continuously going to the step (2); otherwise, the microprocessor controls the touch sensitive password input device to produce a sixth indication, and then repeating the step (1) again.

In one embodiment, the first indication, the second indication, the third indication, the fourth indication, the fifth indication, and the sixth indication are all selected from a group consisting of sound, vibration, and combination of sound and vibration.

In one embodiment, after a return command is inputted into the touch sensitive password input device by utilizing the finger to conduct a virtual return button pressing operation, one designated numeral previously inputted being canceled.

In one embodiment, the input operation is conducted by completing a finger action on the touchscreen, and the finger action is selected from a group consisting of consecutively tapping the touchscreen twice and consecutively tapping the touchscreen thrice.

In one embodiment, the virtual return button pressing operation is conducted by completing a finger action on the touchscreen, and the finger action is selected from a group consisting of consecutively tapping the touchscreen thrice and consecutively tapping the touchscreen twice.

In one embodiment, in case of the finger completing an upward displacement on the touchscreen thereby achieving the swing operation just one time, the microprocessor designates a virtual numeral 2 or 8 to be selected.

In one embodiment, in case of the finger completing a downward displacement on the touchscreen thereby achieving the swing operation just one time, the microprocessor designates a virtual numeral 8 or 2 to be selected.

In one embodiment, in case of the finger consecutively completing a first downward displacement and a second downward displacement on the touchscreen thereby achieving the swing operation two times, the microprocessor designates a virtual numeral 0 to be selected.

In one embodiment, in case of the finger completing a leftward displacement on the touchscreen thereby achieving the swing operation just one time, the microprocessor designates a virtual numeral 4 to be selected.

In one embodiment, in case of the finger completing a rightward displacement on the touchscreen thereby achieving the swing operation just one time, the microprocessor designates a virtual numeral 6 to be selected.

In one embodiment, in case of the finger consecutively completing an upward displacement and a rightward displacement on the touchscreen thereby achieving the swing operation two times, the microprocessor designates a virtual numeral 3 or 9 to be selected.

In one embodiment, in case of the finger consecutively completing an upward displacement and a leftward displacement on the touchscreen thereby achieving the swing operation two times, the microprocessor designates a virtual numeral 1 or 7 to be selected.

In one embodiment, in case of the finger consecutively completing a downward displacement and a rightward displacement on the touchscreen thereby achieving the swing operation two times, the microprocessor designates a virtual numeral 9 or 3 to be selected.

In one embodiment, in case of the finger consecutively completing a downward displacement and a leftward displacement on the touchscreen thereby achieving the swing operation two times, the microprocessor designates a virtual numeral 7 or 1 to be selected.

In one embodiment, in case of the finger consecutively completing a first downward displacement, a second downward displacement and a rightward displacement on the touchscreen thereby achieving the swing operation three times, the microprocessor designates a virtual confirm button or a virtual cancel button to be selected.

In one embodiment, in case of the finger consecutively completing a first downward displacement, a second downward displacement and a leftward displacement on the touchscreen thereby achieving the swing operation three times, the microprocessor designates a virtual cancel button or a virtual confirm button to be selected.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a password input method disclosed by the present invention, embodiments of the present invention will be described in detail with reference to the attached drawings hereinafter.

Figure 1:
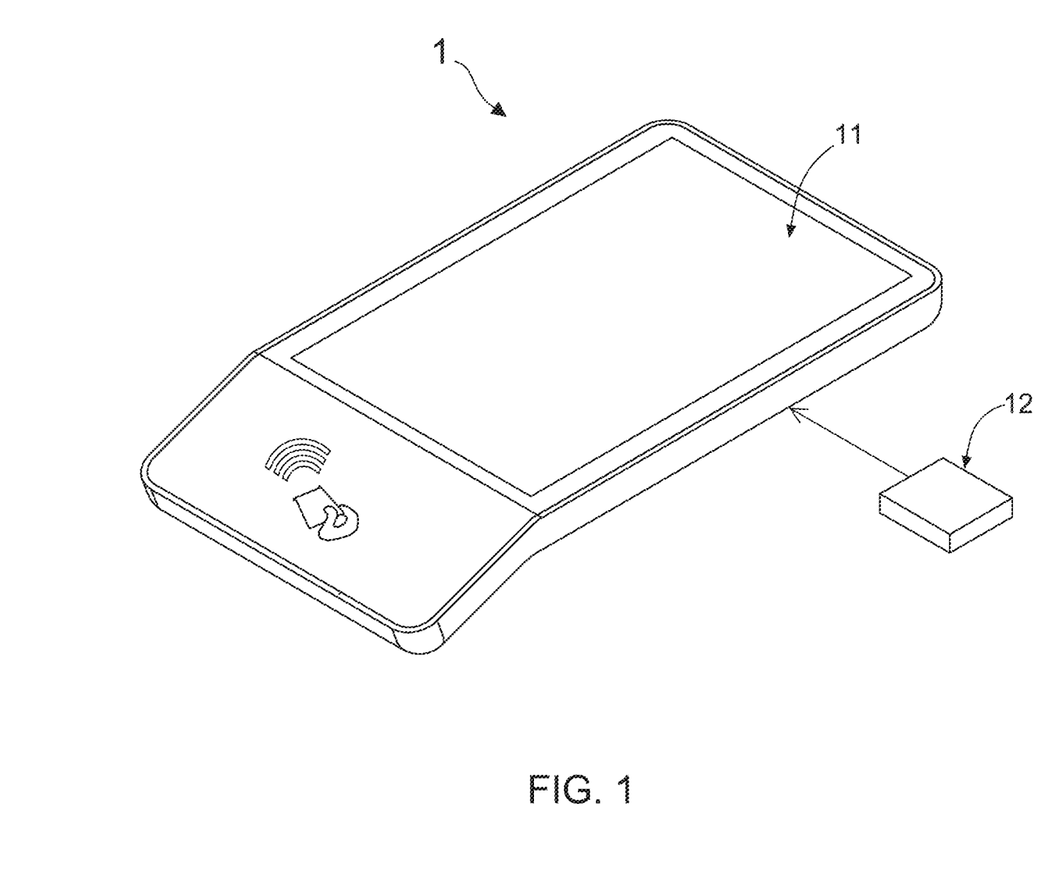
FIG. 1 shows a schematic stereo diagram of a touch sensitive password input device that is applied with a password input method according to the present invention.

With reference to FIG. 1, there is shown a schematic stereo diagram of a touch sensitive password input device that is applied with a password input method according to the present invention. As FIG. 1 shows, the touch sensitive password input device 1 has a touchscreen 11 and a microprocessor 12. In one practicable embodiment, the touch sensitive password input device 1 is integrated in an electronic device like point-of-sale payment terminal, smartphone, tablet computer, all-in-one computer, door station, or keyless electronic door lock. The password input method of the present invention is applied in the touch sensitive password input device 1, so as to be conducted by the microprocessor 11. During the conduction of the password input method, the touch sensitive password input device 1 is controlled to guide a visually impaired person to successfully complete a password input operation with high security.

Figure 2A:
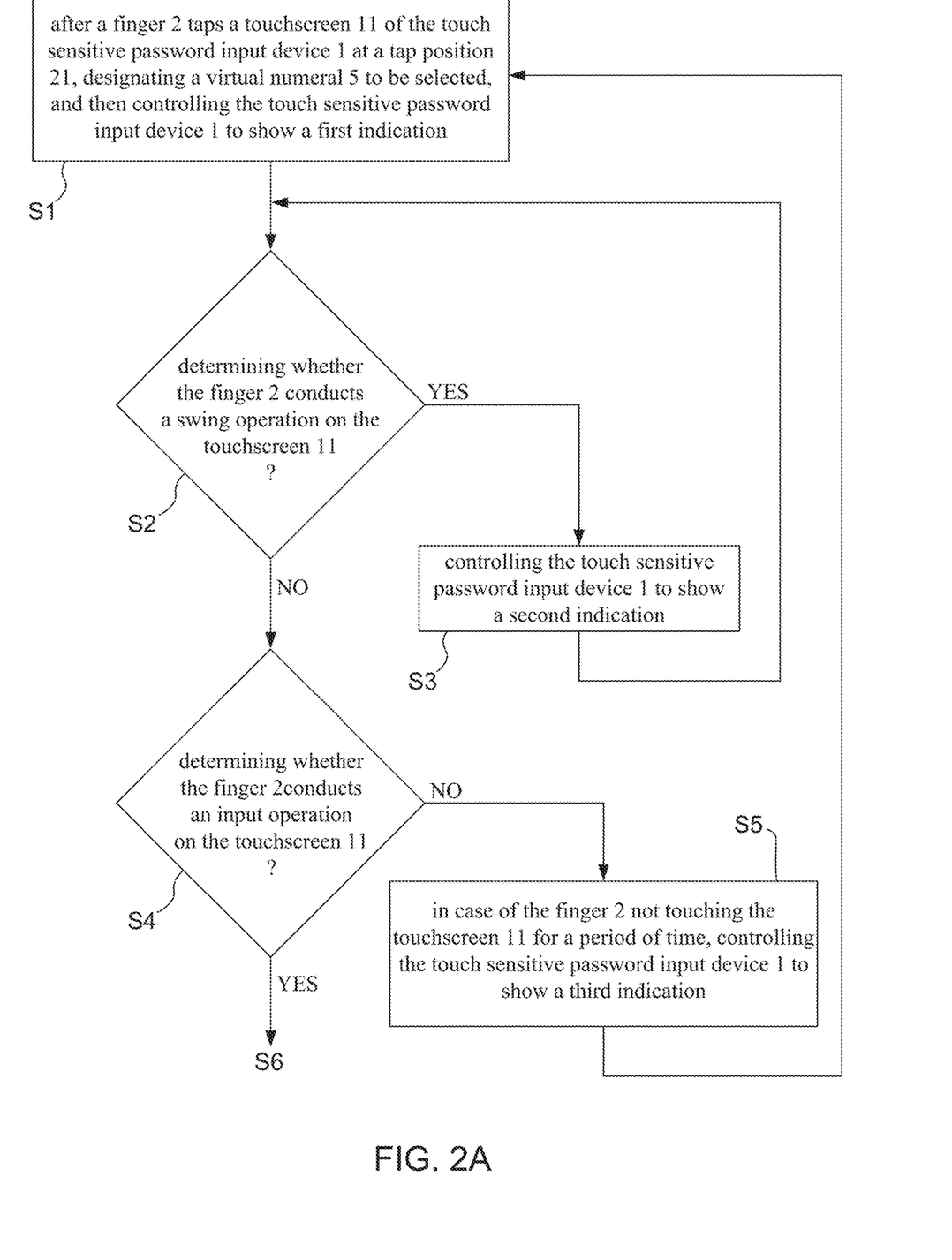
FIG. 2A and FIG. 2B show a complete flowchart of a password input method according to the present invention.
Figure 2B:
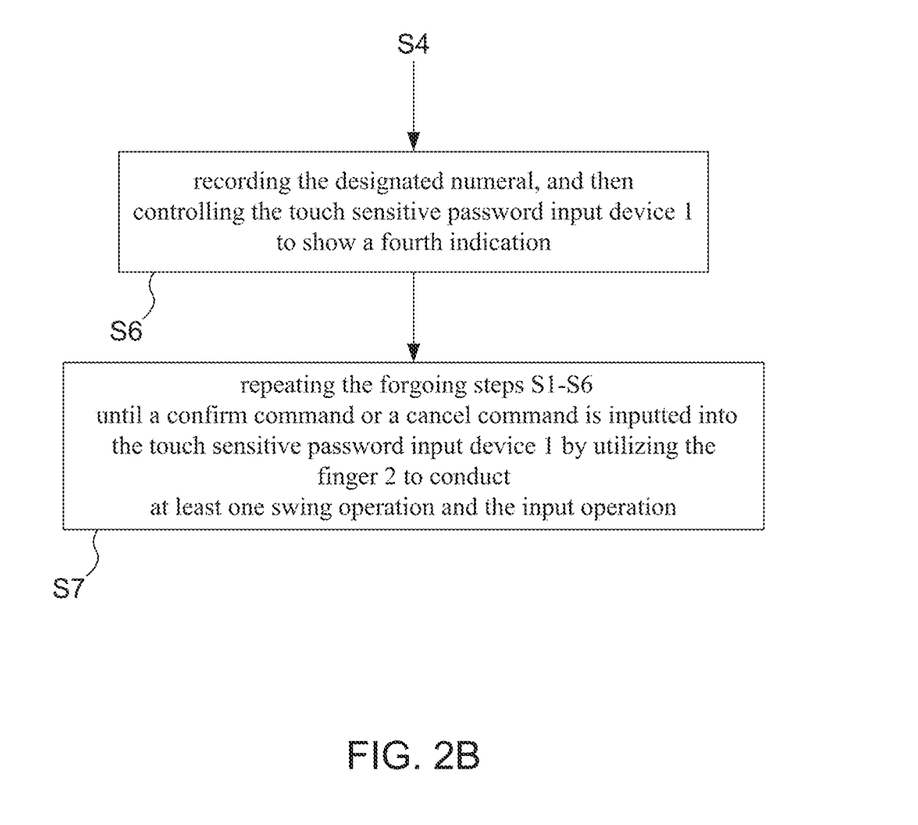
Figure 3A:
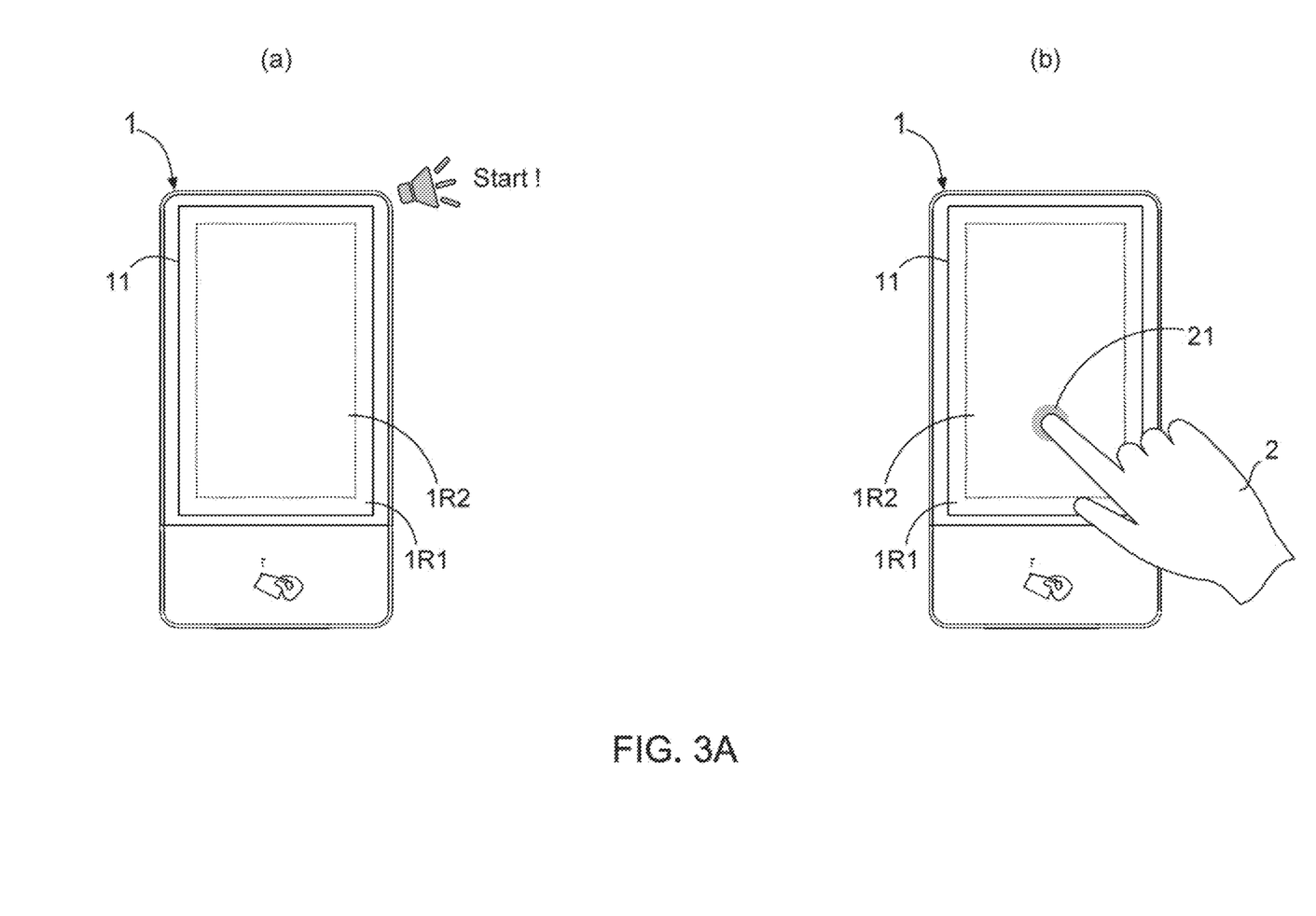
FIG. 3A, FIG. 3B, FIG. 3C, FIG. 3D, and FIG. 3E show diagrams for describing an password input operation applied to the touch sensitive password input device.

FIG. 2A and FIG. 2B show a complete flowchart of a password input method according to the present invention. Moreover, FIG. 3A, FIG. 3B, FIG. 3C, FIG. 3D, and FIG. 3E show diagrams for describing a password input operation applied to the touch sensitive password input device. When being conducted by the microprocessor 12, as FIG. 1, FIG. 2A and FIG. 3A show, the password input method firstly proceeds to step S1. In step S1, the microprocessor designates a virtual numeral 5 to be selected after a finger 2 taps the touchscreen 11 at a tap position 21, and then controls the touch sensitive password input device 1 to show an indication. An example of the indication may be a sound indication. However, in practicable embodiments, the indication can be a sound indication, a vibration indication, or a sound/vibration complex indication.

It needs to particularly mention that, as FIG. 3A show, before conducting the step S1, the microprocessor 12 delimits a first touching region 1R1 and a second touching region 1R2 that falls within the first touching region 1R1 from the touchscreen 11, and then controls the touch sensitive password input device 1 to show an indication for informing a visually impaired person that a password input password input operation can be started. Therefore, during the conduction of the step S1, the microprocessor 12 determines whether the tap position 21 falls within the second touching region 1R2 or not. If yes, the method flow is then proceeded to step S2; otherwise, the microprocessor 12 controls the touch sensitive password input device 1 to produce an indication like sound indication, vibration indication, or sound/vibration complex indication, and then repeats the step S1 again. As explained in more detail below, if the tap position 21 makes by the finger 2 in the step S1 not falls within the second touching region 1R2, it is difficult or may be impossible for the finger 2 to conducts at least one swing operation on the touchscreen 11 in order to select another one virtual numeral that is different from the forgoing virtual numeral 5. For this reason, during the conduction of the step S1, the microprocessor 12 is configured to determine whether the tap position 21 falls within the second touching region 1R2 or not, and controls the touch sensitive password input device 1 to produce the indication to inform the visually impaired person that his finger tap does not fall within the second touching region 1R2.

In one embodiment, when the tap potion 21 falls within the first touching region 1R1 and is adjacent to a right boundary of the second touching region 1R2, the touch sensitive password input device 1 produce the indication to inform the visually impaired person that, he needs to move the finger 2 rightward so as to touch the touchscreen for making the tap position 21 fall within the second touching region 1R2. Moreover, when the tap potion 21 falls within the first touching region 1R1 and is adjacent to a bottom boundary of the second touching region 1R2, the touch sensitive password input device 1 produce the indication to inform the visually impaired person that, he needs to move the finger 2 upward so as to touch the touchscreen for making the tap position 21 fall within the second touching region 1R2. On the other hand, when the tap potion 21 falls within the first touching region 1R1 and is adjacent to a left boundary of the second touching region 1R2, the touch sensitive password input device 1 produce the indication to inform the visually impaired person that, he needs to move the finger 2 rightward so as to touch the touchscreen for making the tap position 21 fall within the second touching region 1R2. Furthermore, when the tap potion 21 falls within the first touching region 1R1 and is adjacent to a top boundary of the second touching region 1R2, the touch sensitive password input device 1 produce the indication to inform the visually impaired person that, he needs to move the finger 2 downward so as to touch the touchscreen for making the tap position 21 fall within the second touching region 1R2.

It should be known that, one kind of physical numeric keypad commonly comprises four rows of buttons. In which, first button row consists of button printed with numeral 1 thereon, button printed with numeral 2 thereon and button printed with numeral 3 thereon. Moreover, second button row consists of button printed with numeral 4 thereon, button printed with numeral 5 thereon and button printed with numeral 6 thereon. On the other hand, third button row consists of button printed with numeral 7 thereon, button printed with numeral 8 thereon and button printed with numeral 9 thereon. Furthermore, fourth button row consists of button printed with one command word (e.g. cancel) thereon, button printed with numeral 0 thereon and button printed with another one command word (e.g. confirm) thereon.

Moreover, it is worth mentioning that there is another one kind of physical numeric keypad also comprises four rows of buttons. In which, first button row consists of button printed with numeral 7 thereon, button printed with numeral 8 thereon and button printed with numeral 9 thereon. Moreover, second button row consists of button printed with numeral 4 thereon, button printed with numeral 5 thereon and button printed with numeral 6 thereon. On the other hand, third button row consists of button printed with numeral 1 thereon, button printed with numeral 2 thereon and button printed with numeral 3 thereon. Furthermore, fourth button row consists of button printed with one command word (e.g. cancel) thereon, button printed with numeral 0 thereon and button printed with another one command word (e.g. confirm) thereon.

Figure 3B:
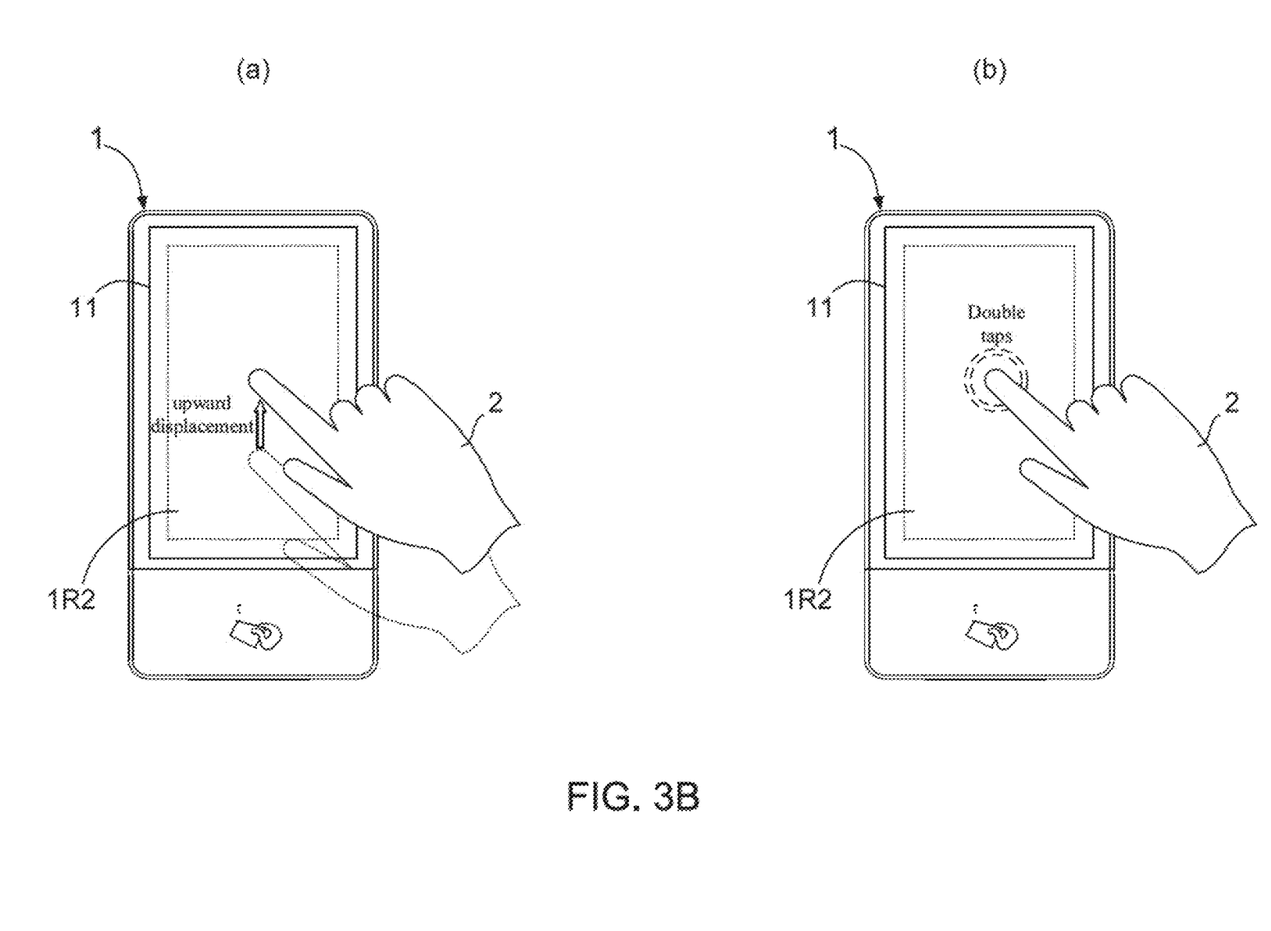

According to FIG. 2A and FIG. 3B, the method flow subsequently proceeds to the step S2, so as to determine whether the finger 2 conducts a swing operation on the touchscreen in order to select another one virtual numeral that is different from the forgoing virtual numeral 5. As described in more detail, the finger 2 is at a tap position 21 on the touchscreen 11, the microprocessor 12 designates a virtual numeral 5 to be selected, and controls the touch sensitive password input device to show an indication (e.g. sound indication). If this designated numeral (i.e., 5) is not the numeral visually impaired person want to input, the visually impaired person needs to conducts at least one swing operation on the touchscreen 11 for selecting another one virtual numeral. For example, as illustration (a) of FIG. 3B shows, in case of the finger 2 completing an upward displacement on the touchscreen 11 thereby achieving the swing operation just one time, the microprocessor 12 designates a virtual numeral 2 or 8 to be selected. Subsequently, as illustration (b) of FIG. 3B shows, the visually impaired person can decide a designated numeral to be inputted into the touch sensitive password input device 1 by utilizing his finger 2 to conduct an input operation on the touchscreen 11. An example of the input operation may be consecutively tapping the touchscreen 11 twice. However, in practicable embodiments, the input operation can be consecutively tapping the touchscreen 11 twice or thrice.

Figure 3C:
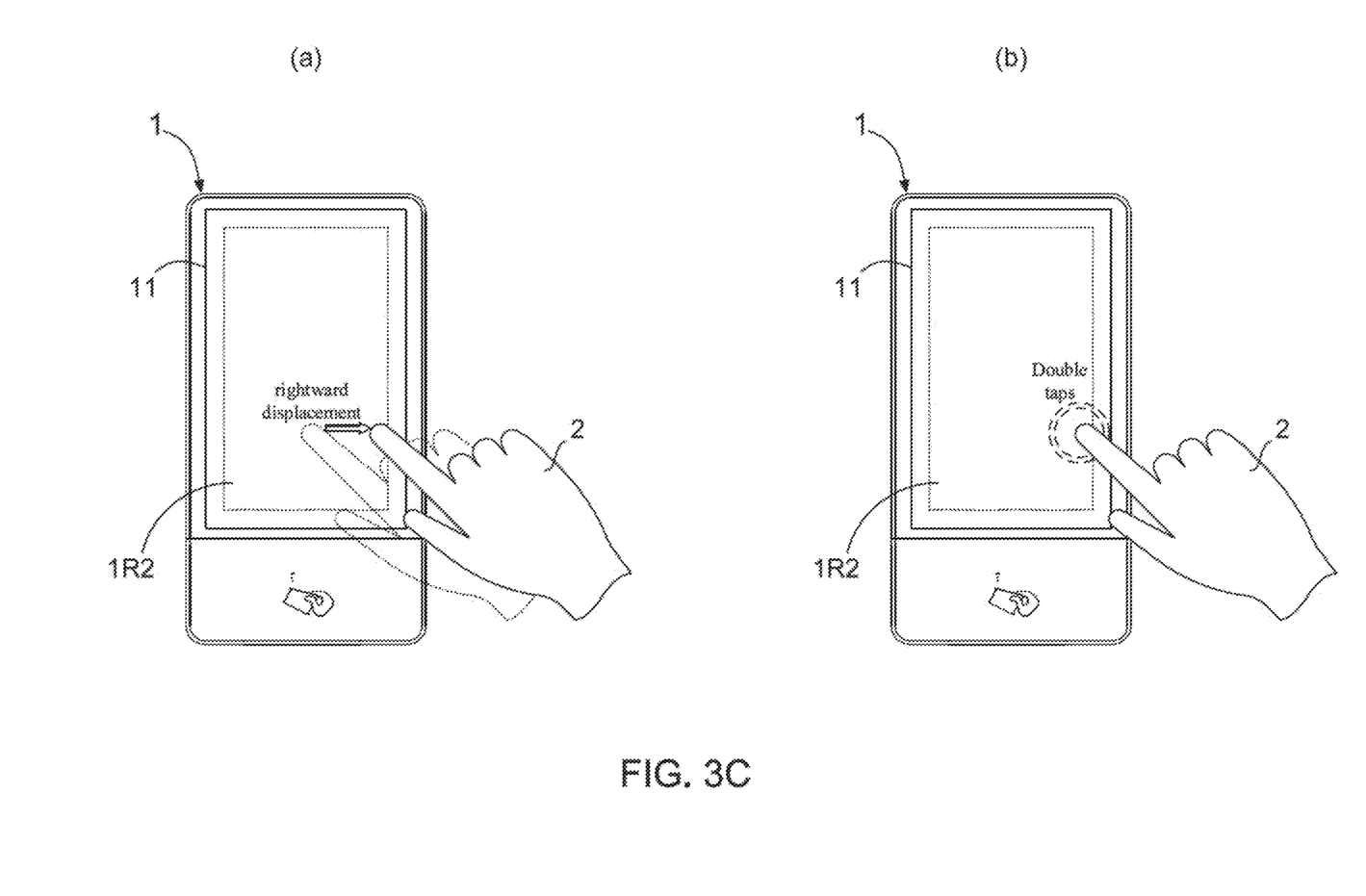

In other words, after creating a tap position 21 on the touchscreen 11 (i.e., completing step S1), as illustration (a) of FIG. 3C, the visually impaired person is able to designate a virtual numeral 6 to be selected by utilizing his finger to complete a rightward displacement on the touchscreen 11 thereby achieving the swing operation just one time. In such case, as illustration (b) of FIG. 3C, the visually impaired person can decide the designated numeral (i.e., 6) to be inputted into the touch sensitive password input device 1 by utilizing his finger 2 to consecutively tap the touchscreen twice thereby completing the input operation on the touchscreen 11.

Figure 3D:
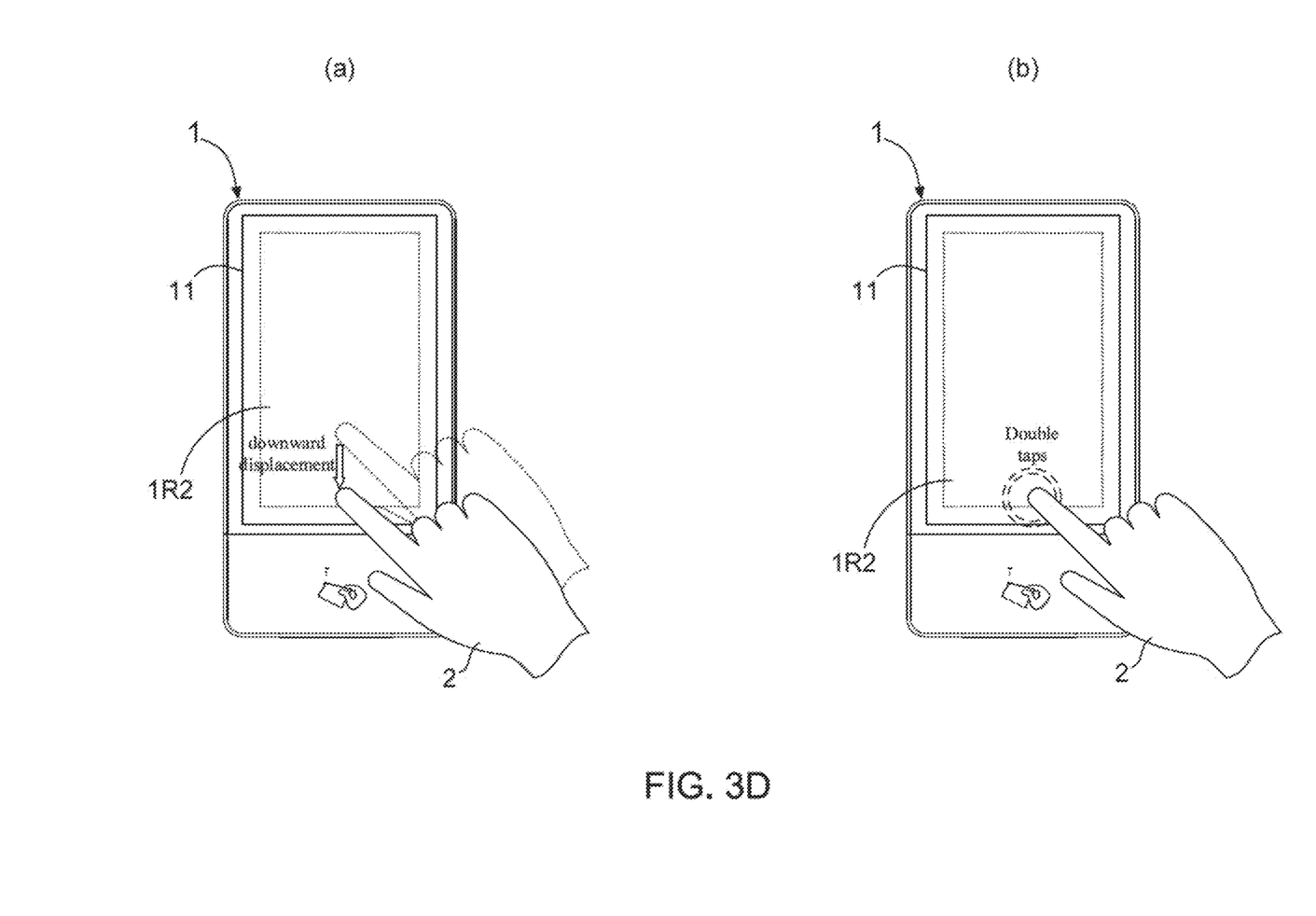

Moreover, after creating a tap position 21 on the touchscreen 11, as illustration (a) of FIG. 3D, the visually impaired person is able to designate a virtual numeral 2 or 8 to be selected by utilizing his finger to complete a downward displacement on the touchscreen 11 thereby achieving the swing operation just one time. In such case, as illustration (b) of FIG. 3D, the visually impaired person can decide the designated numeral (i.e., 2 OR 8) to be inputted into the touch sensitive password input device 1 by utilizing his finger 2 to consecutively tap the touchscreen twice thereby completing the input operation on the touchscreen 11.

Figure 3E:
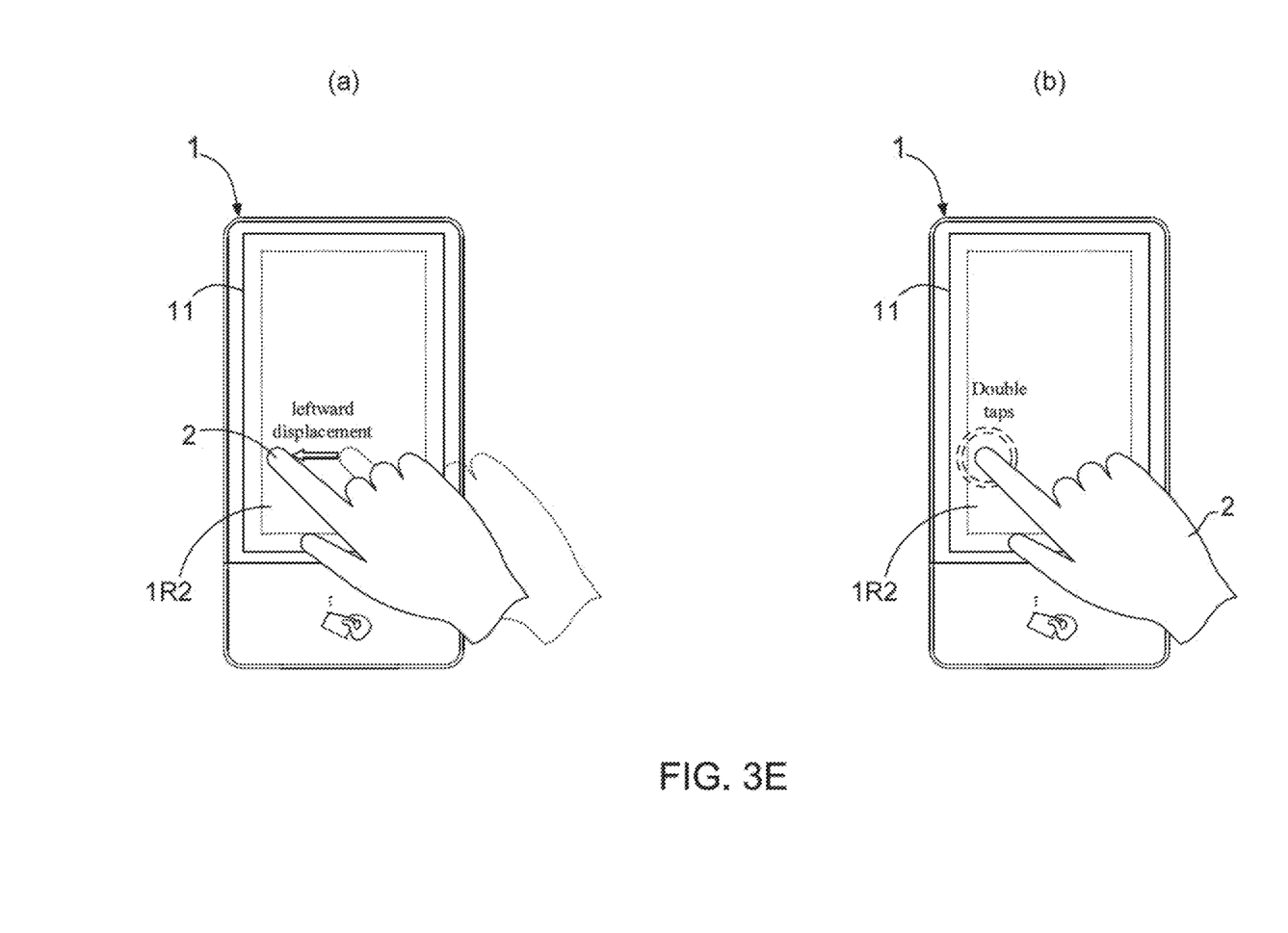

Furthermore, after creating a tap position 21 on the touchscreen 11, as illustration (a) of FIG. 3E, the visually impaired person is able to designate a virtual numeral 4 to be selected by utilizing his finger to complete a leftward displacement on the touchscreen 11 thereby achieving the swing operation just one time. In such case, as illustration (b) of FIG. 3E, the visually impaired person can decide the designated numeral (i.e., 4) to be inputted into the touch sensitive password input device 1 by utilizing his finger 2 to consecutively tap the touchscreen twice thereby completing the input operation on the touchscreen 11.

According to FIG. 2A, in case of a determination result of the step S2 is "Yes", the method flow next proceeds to step S3 so as to control the touch sensitive password input device 1 to show an indication (e.g., sound or vibration), and then the method flow proceeds back to the forgoing step S2. Therefore, according to FIG. 3A, FIG. 3B, FIG. 3C, FIG. 3D, and FIG. 3E, it is understood that, when the visually impaired person want to input a specific numeral into the touch sensitive password input device 1, it is required for the visually impaired person to firstly utilizes his finger to create taps position 21 that falls within the second touching region 1R2 on the touchscreen 11, subsequently to designate the specific numeral to be selected by utilizing his finger to conduct at least one swing operation (e.g., upward/downward/leftward/rightward displacement) on the touchscreen 11, and consequently to input the specific numeral into the touch sensitive password input device 1 by utilizing his finger to conduct an input operation (e.g., consecutively tapping the touchscreen 11 twice) on the touchscreen 11. Briefly speaking, after completing the creation of the tap position 21, at least one swing operation and the input operation, numeral 1, 2, 3, 4, 5, 6, 7, 8, 9, or 0 can be designated to be inputted into the touch sensitive password input device 1.

It is worth particularly explaining that, the touch sensitive password input device 1 is controlled to show a first indication after the tap position 21 is created, and further show a second indication (e.g., voice prompt) after the finger 2 subsequently completes a first downward displacement on the touchscreen 11 thereby achieving the swing operation one time. In such situation, in case of the finger 2 further completing a second downward displacement on the touchscreen 11 thereby achieving the swing operation one time, the microprocessor 12 designates a virtual numeral 0 to be selected. In other words, if the numeral the visually impaired person want to input is 0 instead of 5, it needs to conduct the step S2 and the step S3 twice after completing the step S1, thereby designating a virtual numeral 0 to be selected. Consequently, the designated numeral 0 is therefore inputted into the touch sensitive password input device 1 after completing the step S4.

In addition, the touch sensitive password input device 1 is controlled to show an indication after the tap position 21 is created, and further show another one indication again after the finger 2 subsequently completes an upward displacement on the touchscreen 11 thereby achieving the swing operation one time. In such situation, in case of the finger 2 further completing a rightward displacement on the touchscreen 11 thereby achieving the swing operation one time, the microprocessor 12 designates a virtual numeral 3 or 9 to be selected. Consequently, the designated numeral 3 or 9 is therefore inputted into the touch sensitive password input device 1 after the finger 2 consecutively tapping the touchscreen 11 twice thereby completing the input operation on the touchscreen 11.

Moreover, the touch sensitive password input device 1 is controlled to show an indication after the tap position 21 is created, and further show another one indication again after the finger 2 subsequently completes an upward displacement on the touchscreen 11 thereby achieving the swing operation one time. In such situation, in case of the finger 2 further completing a leftward displacement on the touchscreen 11 thereby achieving the swing operation one time, the microprocessor 12 designates a virtual numeral 1 or 7 to be selected. Consequently, the designated numeral 1 or 7 is therefore inputted into the touch sensitive password input device 1 after the finger 2 consecutively tapping the touchscreen 11 twice thereby completing the input operation on the touchscreen 11.

According to FIGS. 3A-3E, the touch sensitive password input device 1 is controlled to show an indication after the tap position 21 is created, and further show another one indication again after the finger 2 subsequently completes an downward displacement on the touchscreen 11 thereby achieving the swing operation one time. In such situation, in case of the finger 2 further completing a rightward displacement on the touchscreen 11 thereby achieving the swing operation one time, the microprocessor 12 designates a virtual numeral 9 or 3 to be selected. Consequently, the designated numeral 9 or 3 is therefore inputted into the touch sensitive password input device 1 after the finger 2 consecutively tapping the touchscreen 11 twice thereby completing the input operation on the touchscreen 11.

As described in more detail below, the touch sensitive password input device 1 is controlled to show an indication after the tap position 21 is created, and further show another one indication again after the finger 2 subsequently completes an downward displacement on the touchscreen 11 thereby achieving the swing operation one time. In such situation, in case of the finger 2 further completing a leftward displacement on the touchscreen 11 thereby achieving the swing operation one time, the microprocessor 12 designates a virtual numeral 7 or 1 to be selected. Consequently, the designated numeral 7 or 1 is therefore inputted into the touch sensitive password input device 1 after the finger 2 consecutively tapping the touchscreen 11 twice thereby completing the input operation on the touchscreen 11.

In one embodiment, the touch sensitive password input device 1 is controlled to show an indication after the tap position 21 is created, and further show another one indication again after the finger 2 subsequently completes completing a first downward displacement, a second downward displacement and a rightward displacement in turns on the touchscreen 11 thereby achieving the swing operation three times, the microprocessor 12 designates a virtual confirm button or a virtual cancel button to be selected. Consequently, a confirm command or a cancel command is therefore inputted into the touch sensitive password input device 1 after the finger 2 consecutively tapping the touchscreen 11 twice thereby completing the input operation on the touchscreen 11.

In one embodiment, the touch sensitive password input device 1 is controlled to show an indication after the tap position 21 is created, and further show another one indication again after the finger 2 subsequently completes completing a first downward displacement, a second downward displacement and a leftward displacement in turns on the touchscreen 11 thereby achieving the swing operation three times, the microprocessor 12 designates a virtual cancel button or a virtual confirm button to be selected. Consequently, a cancel command or a confirm command is therefore inputted into the touch sensitive password input device 1 after the finger 2 consecutively tapping the touchscreen 11 twice thereby completing the input operation on the touchscreen 11.

According to above descriptions, it is understood that, if the numeral the visually impaired person want to input is 2, 4, 6, or 8 instead of 5, it needs to conduct the step S2 and the step S3 one time after completing the step S1, thereby designating a virtual numeral 2, 4, 6, or 8 to be selected. Consequently, the designated numeral 2, 4, 6, or 8 is therefore inputted into the touch sensitive password input device 1 after completing the step S4. Moreover, if the numeral the visually impaired person want to input is 0, 1, 3, 7, or 9 instead of 5, it needs to conduct the step S2 and the step S3 one time after completing the step S1, thereby designating a virtual numeral 0, 1, 3, 7, or 9 to be selected. Consequently, the designated numeral 0, 1, 3, 7, or 9 is therefore inputted into the touch sensitive password input device 1 after completing the step S4.

According to FIG. 2A, a specific virtual numeral is selected in case of a determination result of the step S2 is "No". In such situation, the method flow next proceeds to step S4 so as to determining whether the finger 2 conducts an input operation (e.g., consecutively tapping the touchscreen twice) on the touchscreen 11 or not. In case of a determination result of the step S4 is "No", the method proceeds to step S5. In the step S5, the microprocessor 12 controls the touch sensitive password input device 1 to show an indication in case of the finger 2 not touching the touchscreen 11 for a period of time. Then, the method flow proceeds back to the forgoing step S1. On the contrary, the method flow proceeds to step S6 in case of a determination result of the step S4 is "Yes". In the step S6, the microprocessor 12 records the designated numeral, and then controls the touch sensitive password input device 1 to show an indication. Eventually, the method flow proceeds to step S7. During the conduction of the step S7, the forgoing steps (1)-(6) are repeated until a confirm command or a cancel command is inputted into the touch sensitive password input device by utilizing the finger 2 to conduct at least one swing operation and the input operation.

Figure 4A:
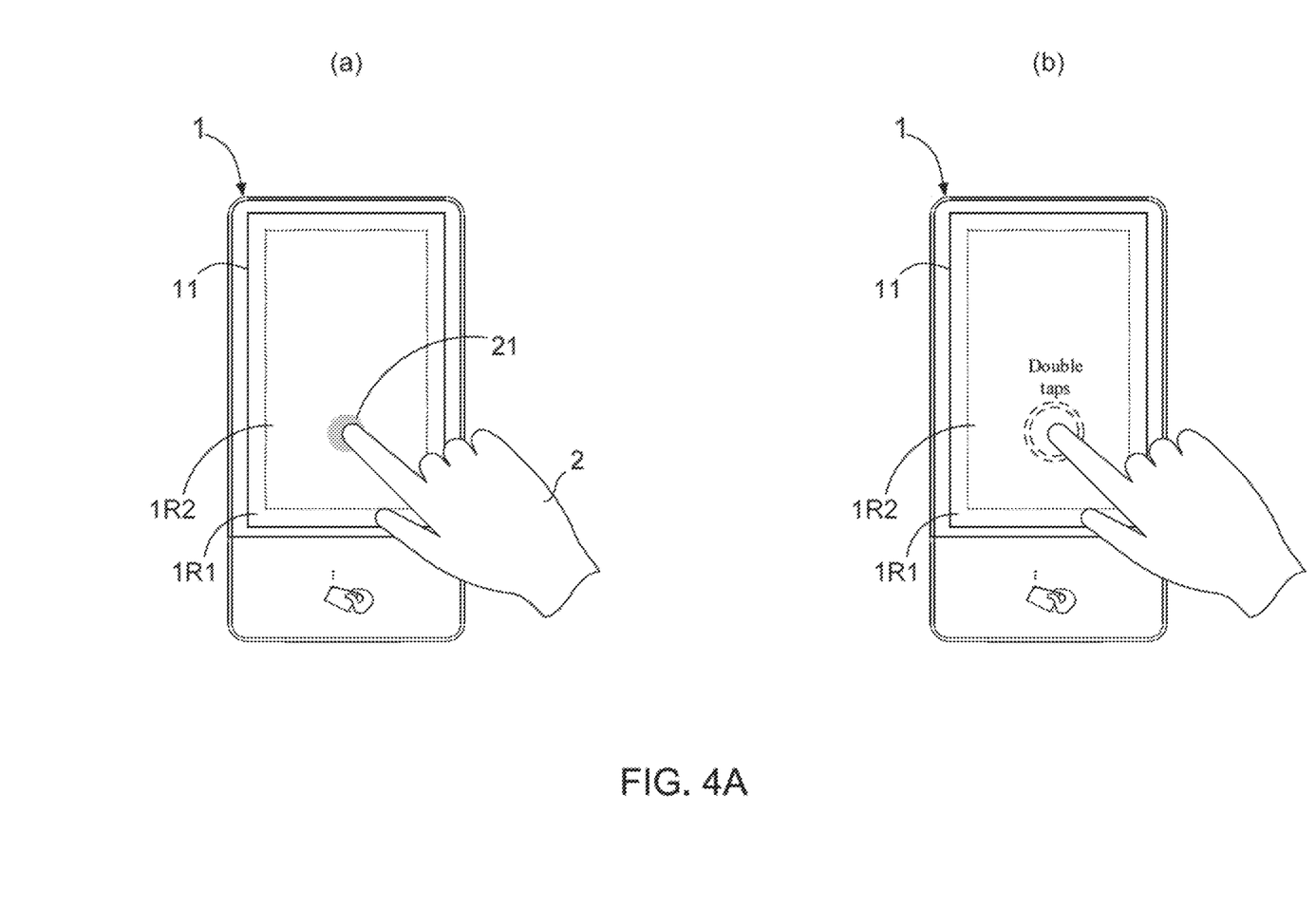
FIG. 4A, FIG. 4B, FIG. 4C, FIG. 4D, and FIG. 4E show diagrams for describing n password input operation applied to the touch sensitive password input device.

FIG. 4A, FIG. 4B, FIG. 4C, FIG. 4D, and FIG. 4E show diagrams for describing a password input operation applied to the touch sensitive password input device. For example, as illustrations (a) and (b) of FIG. 4A shows, the touch sensitive password input device 1 produces an indication after a tap position 21 is created on the touchscreen 11, and then the visually impaired person is able to designate a numeral 5 to be inputted into the touch sensitive password input device by utilizing his finger 2 to consecutively tap the touchscreen 11 twice.

Figure 4B:
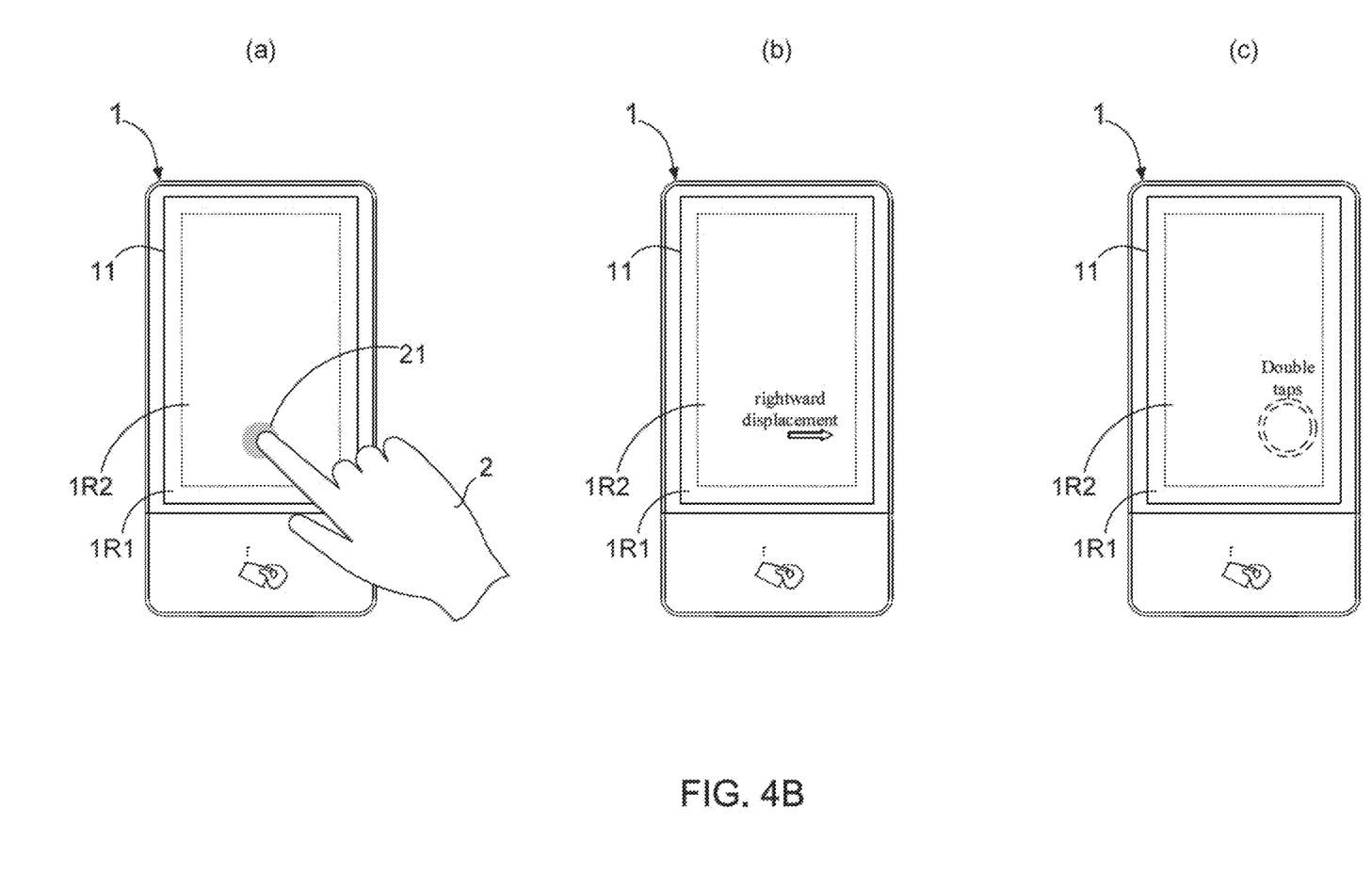

After the numeral 5 is inputted, as illustrations (a) and (b) of FIG. 4B shows, the touch sensitive password input device 1 produces an indication after the visually impaired person creates a new tap position 21 on the touchscreen 11, and then a virtual numeral 6 is be selected after the finger 2 completes a rightward displacement on the touchscreen 11 thereby achieving the swing operation one time. Consequently, the visually impaired person is able to designate the numeral 6 to be inputted into the touch sensitive password input device 1 by utilizing his finger 2 to consecutively tap the touchscreen 11 twice.

Figure 4C:
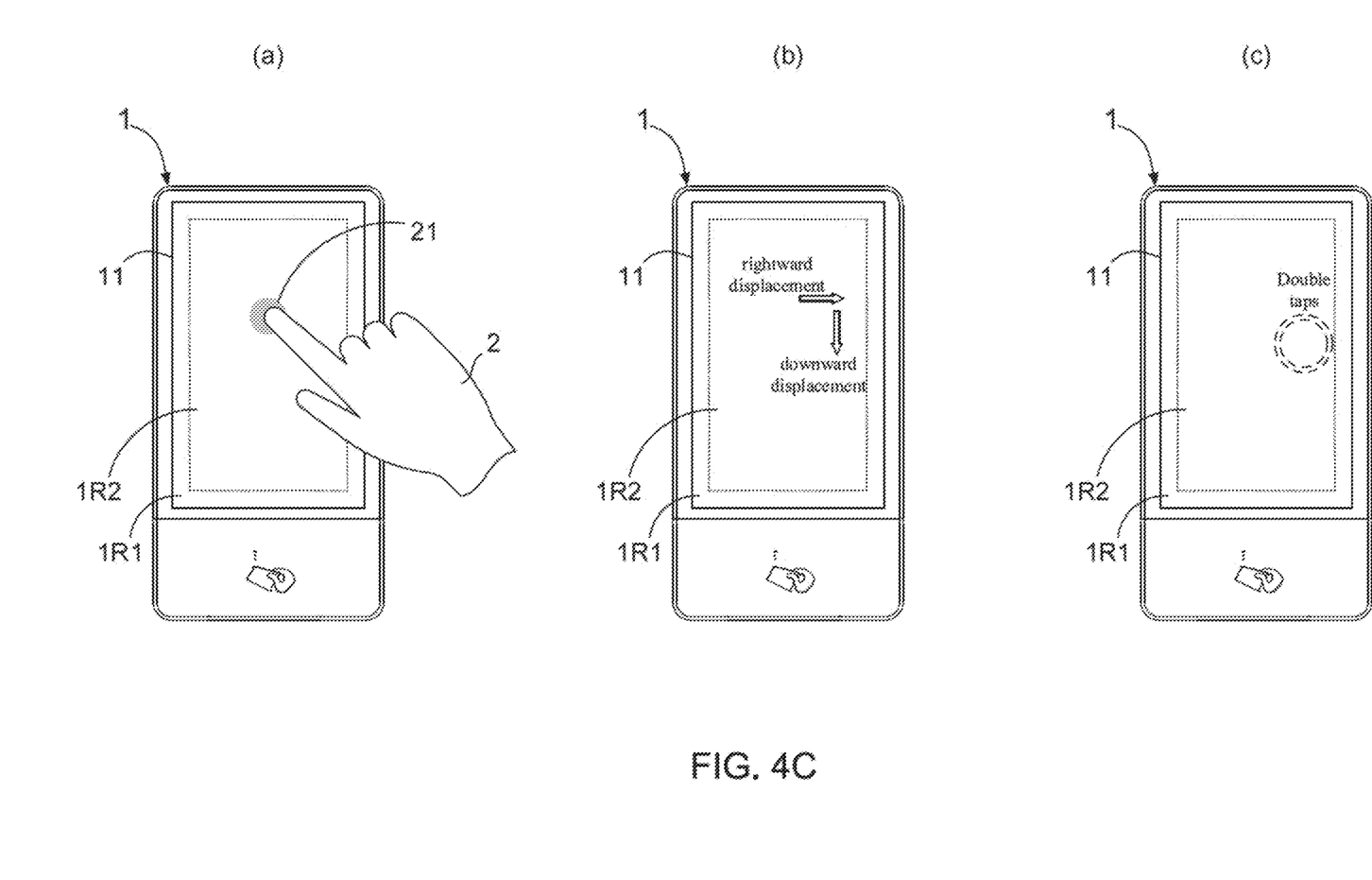

After the numeral 6 is inputted, as illustrations (a) and (b) of FIG. 4C shows, the touch sensitive password input device 1 produces an indication after the visually impaired person creates a new tap position 21 on the touchscreen 11, and then a virtual numeral 9 is be selected after the finger 2 consecutively completes a downward displacement and a rightward displacement on the touchscreen 11 thereby achieving the swing operation two times. Consequently, the visually impaired person is able to designate the numeral 9 to be inputted into the touch sensitive password input device 1 by utilizing his finger 2 to consecutively tap the touchscreen 11 twice.

Figure 4D:
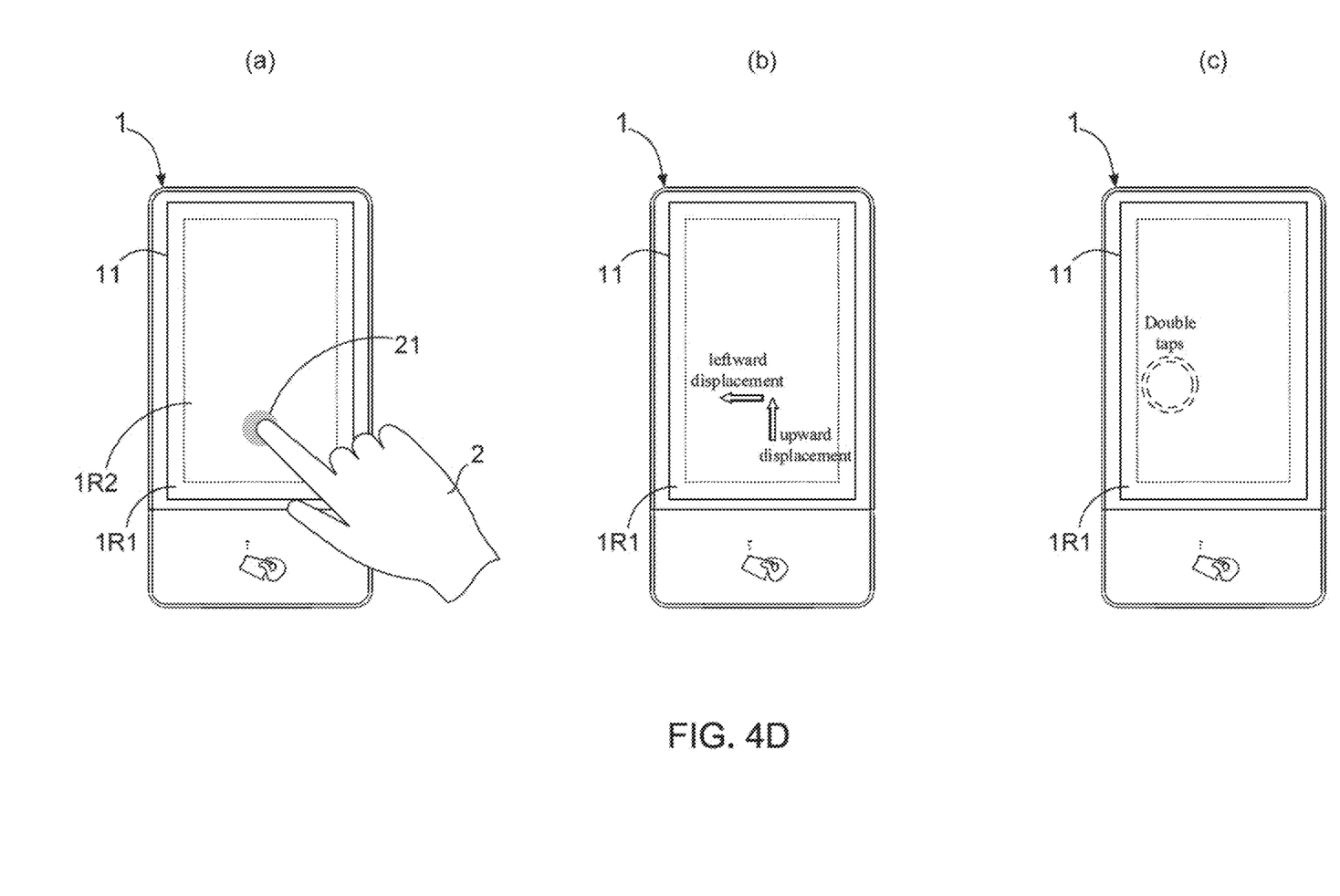

After the numeral 9 is inputted, as illustrations (a) and (b) of FIG. 4D shows, the touch sensitive password input device 1 produces an indication after the visually impaired person creates a new tap position 21 on the touchscreen 11, and then a virtual numeral 1 is be selected after the finger 2 consecutively completes an upward displacement and a leftward displacement on the touchscreen 11 thereby achieving the swing operation two times. Consequently, the visually impaired person is able to designate the numeral 1 to be inputted into the touch sensitive password input device 1 by utilizing his finger 2 to consecutively tap the touchscreen 11 twice.

Figure 4E:
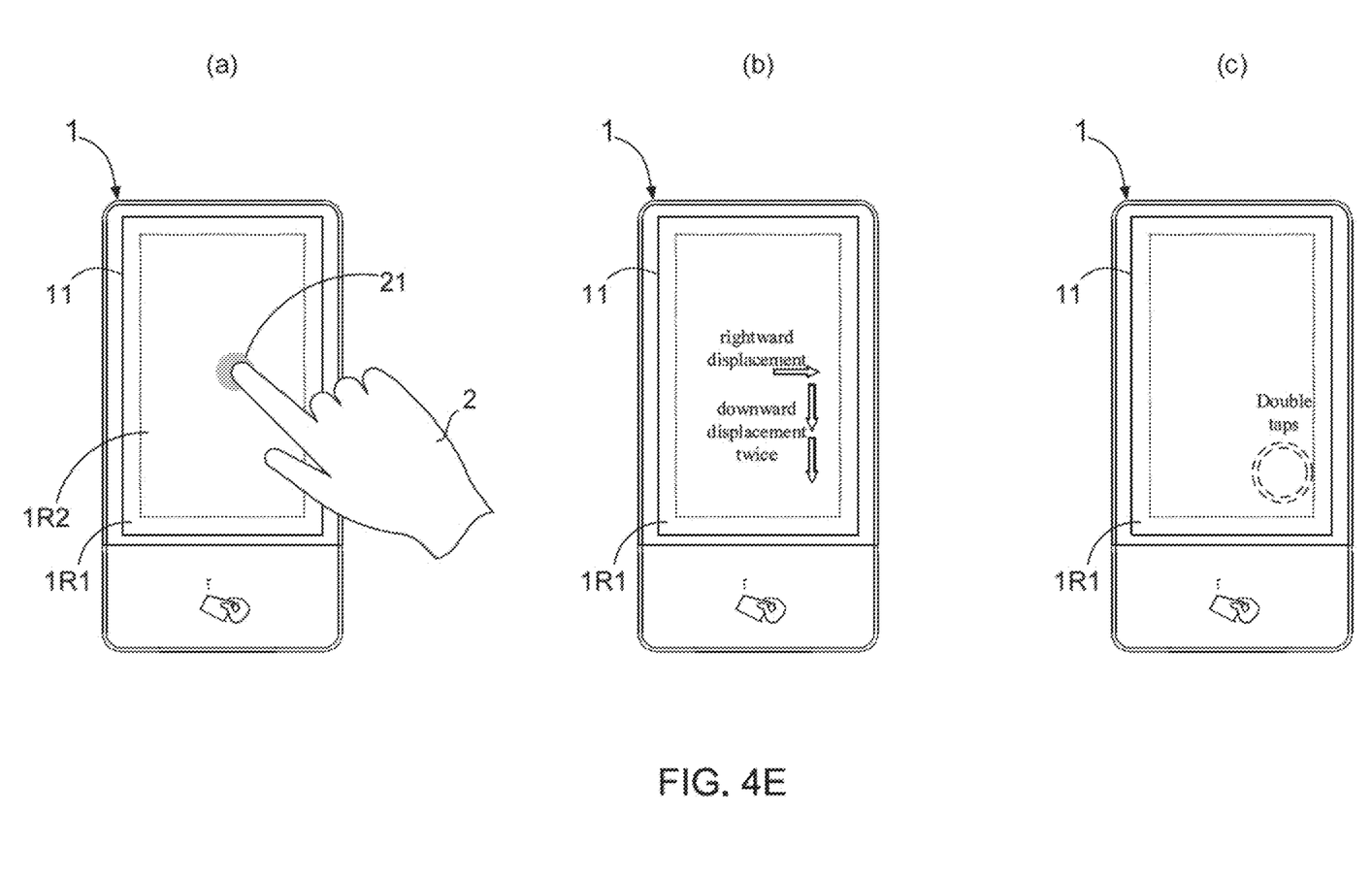

The inputted numerals 5, 6, 9, and 1 are respectively recorded by the microprocessor 12 in each numeral inputting procedure consisting of the creation of the tap position 21, at least one swing operation and the input operation, and the then microprocessor 12 controls the touch sensitive password input device 1 to show an indication (i.e., step S6). As illustrations (a) and (b) of FIG. 4E shows, the touch sensitive password input device 1 produces an indication after the visually impaired person creates a new tap position 21 on the touchscreen 11, and then a virtual confirm button is be selected after the finger 2 consecutively completes a first downward displacement, a second downward displacement and a rightward displacement on the touchscreen 11 thereby achieving the swing operation three times. Consequently, the visually impaired person is able to input a confirm command into the touch sensitive password input device 1 by utilizing his finger 2 to consecutively tap the touchscreen 11 twice. As a result, a password consisting of four numerals 5691 are therefore inputted into the touch sensitive password input device 1 with high security.

It is worth further explain that, during the numeral inputting procedure being on going, one numeral previously inputted would be canceled after a return command is inputted into the touch sensitive password input device 1 by utilizing the finger 2 to conduct a virtual return button pressing operation. In one embodiment, the virtual return button pressing operation is conducted by completing a finger action on the touchscreen 11, and the finger action can be consecutively tapping the touchscreen thrice or consecutively tapping the touchscreen twice.

Moreover, it is understood that, the first indication, the second indication, the third indication, the fourth indication, the fifth indication, and the sixth indication are all selected from a group consisting of sound indication, vibration indication, and combination of sound/vibration complex indication. Each of the indications are produced by the touch sensitive password input device 1 for informing a visually impaired person that he has been successively complete the creation of the tap position 21, the swing operation or the input operation.

Therefore, through the above descriptions, all embodiments of the password input method according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A password input method, being conducted by a microprocessor of a touch sensitive password input device, and comprising following steps of:
   (1) after a finger taps a touchscreen of the touch sensitive password input device at a tap position, designating a virtual numeral 5 to be selected, and then controlling the touch sensitive password input device to show a first indication;

(2) determining whether the finger conducts a swing operation on the touchscreen in order to select another one virtual numeral that is different from the forgoing virtual numeral 5, if yes, going to step (3); otherwise, going to step (4);

(3) controlling the touch sensitive password input device to show a second indication, and then going back to the forgoing step (2);

(4) determining whether the finger conducts an input operation on the touchscreen in order to make a designated numeral be inputted into the touch sensitive password input device, if yes, going to step (6); otherwise, going to step (5);

(5) in case of the finger not touching the touchscreen for a period of time, controlling the touch sensitive password input device to show a third indication, and then going back to the forgoing step (1);

(6) recording the designated numeral, and then controlling the touch sensitive password input device to show a fourth indication; and (7) repeating the forgoing steps (1)-(6) until a confirm command or a cancel command is inputted into the touch sensitive password input device by utilizing the finger to conduct at least one swing operation and the input operation.

2. The password input method of claim 1, wherein the touch sensitive password input device is integrated in an electronic device selected from a group consisting of point-of-sale payment terminal, smartphone, tablet computer, all-in-one computer, door station, and keyless electronic door lock.

3. The password input method of claim 1, wherein before conducting the step (1), the microprocessor delimiting a first touching region and a second touching region that falls within the first touching region from the touchscreen, and then controlling the touch sensitive password input device to show a fifth indication for informing a visually impaired person that a password input password input operation can be started.

4. The password input method of claim 3, wherein during the step (1) being conducted, the microprocessor determining whether the tap position falls within the second touching region, if yes, continuously going to the step (2); otherwise, the microprocessor controlling the touch sensitive password input device to produce a sixth indication, and then repeating the step (1) again.

5. The password input method of claim 4, wherein the first indication, the second indication, the third indication, the fourth indication, the fifth indication, and the sixth indication are all selected from a group consisting of sound indication, vibration indication, and combination of sound/vibration complex indication.

6. The password input method of claim 1, wherein after a return command is inputted into the touch sensitive password input device by utilizing the finger to conduct a virtual return button pressing operation, one designated numeral previously inputted being canceled.

7. The password input method of claim 1, wherein the input operation is conducted by completing a finger action on the touchscreen, and the finger action being selected from a group consisting of consecutively tapping the touchscreen twice and consecutively tapping the touchscreen thrice.

8. The password input method of claim 6, wherein the virtual return button pressing operation is conducted by completing a finger action on the touchscreen, and the finger action being selected from a group consisting of consecutively tapping the touchscreen thrice and consecutively tapping the touchscreen twice.

9. The password input method of claim 1, wherein in case of the finger completing an upward displacement on the touchscreen thereby achieving the swing operation just one time, the microprocessor designating a virtual numeral 2 or 8 to be selected.

10. The password input method of claim 1, wherein in case of the finger completing a downward displacement on the touchscreen thereby achieving the swing operation just one time, the microprocessor designating a virtual numeral 8 or 2 to be selected.

11. The password input method of claim 1, wherein in case of the finger consecutively completing a first downward displacement and a second downward displacement on the touchscreen thereby achieving the swing operation two times, the microprocessor designating a virtual numeral 0 to be selected.

12. The password input method of claim 1, wherein in case of the finger completing a leftward displacement on the touchscreen thereby achieving the swing operation just one time, the microprocessor designating a virtual numeral 4 to be selected.

13. The password input method of claim 1, wherein in case of the finger completing a rightward displacement on the touchscreen thereby achieving the swing operation just one time, the microprocessor designating a virtual numeral 6 to be selected.

14. The password input method of claim 1, wherein in case of the finger consecutively completing an upward displacement and a rightward displacement on the touchscreen thereby achieving the swing operation two times, the microprocessor designating a virtual numeral 3 or 9 to be selected.

15. The password input method of claim 1, wherein in case of the finger consecutively completing an upward displacement and a leftward displacement on the touchscreen thereby achieving the swing operation two times, the microprocessor designating a virtual numeral 1 or 7 to be selected.

16. The password input method of claim 1, wherein in case of the finger consecutively completing a downward displacement and a rightward displacement on the touchscreen thereby achieving the swing operation two times, the microprocessor designating a virtual numeral 9 or 3 to be selected.

17. The password input method of claim 1, wherein in case of the finger consecutively completing a downward displacement and a leftward displacement on the touchscreen thereby achieving the swing operation two times, the microprocessor designating a virtual numeral 7 or 1 to be selected.

18. The password input method of claim 1, wherein in case of the finger consecutively completing a first downward displacement, a second downward displacement and a rightward displacement on the touchscreen thereby achieving the swing operation three times, the microprocessor designating a virtual confirm button or a virtual cancel button to be selected.

19. The password input method of claim 1, wherein in case of the finger consecutively completing a first downward displacement, a second downward displacement and a leftward displacement on the touchscreen thereby achieving the swing operation three times, the microprocessor designating a virtual cancel button or a virtual confirm button to be selected.

\* \* \* \* \*